United States Patent
Bottazzi et al.

(10) Patent No.: US 9,990,522 B2
(45) Date of Patent: Jun. 5, 2018

(54) OPTICAL CODE READER

(71) Applicant: Datalogic IP Tech S.R.L., Calderara Di Reno, Bologna (IT)

(72) Inventors: Davide Bottazzi, Bologna (IT); Davide Bruni, Bologna (IT); Federico Canini, Bologna (IT); Luca Perugini, Bologna (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days. days.

(21) Appl. No.: 15/639,577

(22) Filed: Jun. 30, 2017

(65) Prior Publication Data
US 2018/0004994 A1    Jan. 4, 2018

(30) Foreign Application Priority Data
Jul. 1, 2016  (IT) ..................... 102016000068779

(51) Int. Cl.
G06K 7/00    (2006.01)
G06K 7/10    (2006.01)
G06K 7/14    (2006.01)

(52) U.S. Cl.
CPC ....... G06K 7/10722 (2013.01); G06K 7/1413 (2013.01); G06K 7/1417 (2013.01)

(58) Field of Classification Search
CPC ........ G02B 7/08; G11B 7/0937; H02N 2/025; H02N 2/026; H02N 2/04
USPC ....................................................... 235/439
See application file for complete search history.

(56) References Cited

U.S. PATENT DOCUMENTS

2007/0280667 A1    12/2007    Shin
2009/0195878 A1    8/2009     Kurosawa
2017/0047864 A1*   2/2017     Stang ..................... H02N 2/026

FOREIGN PATENT DOCUMENTS

EP    3029520 A1    8/2016
WO    01/88588 A2   11/2001

OTHER PUBLICATIONS

Italian Search Report for IT 201600068779, dated May 16, 2017, 2 pages.

* cited by examiner

*Primary Examiner* — Seung Lee
(74) *Attorney, Agent, or Firm* — Dentons US LLP

(57) ABSTRACT

An imager module for an optical code reader may include a camera comprising a lens system, and an actuator for moving the lens system operatively connected to the lens system for autofocus adjustment. The actuator for moving the lens system comprises a linear electric motor with a drive shaft, a position sensor device adapted to detect the position of the drive shaft within a predefined stroke length and a control device adapted to control the movement of the drive shaft. The control device and the position sensor device are integrated in a single PCB, the electric motor comprises a frame that supports the drive shaft, and the single PCB constitutes part of said frame. On optical code reader may include such an imager module.

13 Claims, 8 Drawing Sheets

OPTICAL CODE READER

CROSS REFERENCE TO RELATED APPLICATIONS

This application claims priority under 35 U.S.C. 119 or 365 to co-pending Italian Application No. 102016000068779, filed on Jul. 1, 2016, which is incorporated herein by reference in its entirety.

FIELD OF THE INVENTION

The present invention relates to an optical code reader. In particular, the present invention relates to an imager module for an optical code reader as well as to an optical code reader comprising said imager module.

BACKGROUND OF THE INVENTION

The term "code" is meant to indicate any graphical representation that has the function of storing coded information. The term "coded information" is meant to indicate the set of identification data contained within a code, such as an optical code. The term "optical code" comprises graphical representations detectable both in the visible light field and in the range of wavelengths between infrared and ultraviolet.

Particular examples of an optical code consist in linear or two-dimensional codes, wherein information is encoded by using appropriate combinations of fixed-shape elements, for example square, rectangular or hexagonal, of a dark color (usually black) separated by light elements (spaces, usually white), such as bar codes, stacked codes and two-dimensional codes in general, color codes, etc. The term "optical code" also comprises, more generally, other graphical forms with an information coding function, including clearly printed characters (letters, numbers, etc.), special patterns ("pattern") (such as stamps, logos, signatures, fingerprints, etc.) and optical information hidden by means of Digital Water Marking techniques.

The coded information can relate, for example, to distance, volume, size, identification data of an object and/or information relating to the object.

In the past, when there were only linear codes, optical code reading was usually performed by means of scanning an optical code using a beam of laser light emitted from a special laser reader or imager systems based on linear CCD sensors were used. With the advent of two-dimensional codes, the use of optical code readers of the imager type has become widespread, where the entire code, or the entire width of a linear code, is simultaneously illuminated and the light diffused by the entire illuminated optical code is collected and detected by a matrix type photo detector or image sensor. Imager type optical readers are typically equipped with an imager module (also called "imager engine" or "scan engine"), integrating a digital camera based on CCD or CMOS sensors.

The cameras are equipped with a lens system adapted to collect the light diffused by the optical code and convey it to the photo detector or image sensor, which converts the intensity thereof into an electrical signal. The image sensor is appropriately placed on the focal plane of the lens system, that is to say on the plane where the lens system is capable of reconstructing a focused image. The focal distance represents the distance from the lens system's optical center to the focal plane. In order to be able to clearly view an image, focusing is performed consisting in focusing the lens system at a suitable distance between the focal plane and the photographed object.

Optical code readers should be able to focus, that is, to adjust the distance between the lens system and the sensor to allow for the reading of optical codes at different distances. Such "dynamic" focus code readers are also known as autofocus readers.

The focus adjustment can be of an automatic or manual type. In either case, the focus adjustment system may comprise a lens system motion mechanism.

In the event of optical code readers with automatic focus adjustment, the motion mechanism typically comprises an electrical actuator. The drive of the electrical actuator can be controlled, during the normal operation of the optical code reader, based on the distance of the code to be read, automatically detected by the optical code reader by means of image analysis techniques or by a distance measuring instrument associated with the above reader.

SUMMARY OF THE INVENTION

The technical problem underlying the present invention is to provide an imager module for an optical code reader of the imager type, with automatic focus adjustment, provided with a lens system motion actuator that is optimized in terms of miniaturization, precision, cost, power consumption and speed.

In a first aspect thereof, the invention relates to an imager module for an optical code reader comprising: a camera comprising a lens system, an actuator for moving the lens system, operatively connected to the lens system for autofocus adjustment, the actuator comprising a linear electric motor with a drive shaft, a position sensor device adapted to detect the position of the drive shaft within a predefined stroke length and a control device adapted to control the movement of the drive shaft, and wherein: the control device and the position sensor device are integrated in a single PCB, the electric motor comprises a frame that supports the drive shaft, and said single PCB constitutes part of said frame.

The imager module according to the invention, wherein the control device and the position sensor device are integrated into a single PCB (i.e., in a single integrated circuit), which is part of the electric motor frame, advantageously allows for the implementation of a lens system motion actuator which is miniaturized and at the same time accurate both for the detection of the drive shaft position (ensuring, for example, a precision of ±5 μm in the two feed directions of the shaft, with virtually zero hysteresis) and for giving a motion command to the drive shaft (ensuring, for example, that a motion command of ±5 μm is punctually given to the drive shaft with a negligible error with respect to the precision set).

The integration of the control device and the position sensor device into a single PCB makes it possible, in fact, to minimize the distance of the electrical connection paths between the two devices. This reduces the electrical noise of the position sensor device which could otherwise deteriorate the electrical signal from the sensor to the control device and, thus, generate position errors. Additionally, the integration of the position sensor device into the PCB, which is part of the electric motor frame, allows to provide, by construction, the ideal mechanical coupling between the device and the drive shaft, thus increasing the mechanical coupling precision. In addition, the integration of the control device and the position sensor device into a single PCB enables the implementation of position control functions and of the entire kinematics imprinted at the drive shaft in a same processing unit (i.e., in a single electronic processor that integrates both analog-to-digital conversion functions and the function of generating a three-phase electrical drive signal for the electric motor), allowing benefits to be gained from the point of view of performance and system dimensions.

In the imager module according to the invention the various components are thus positioned close to each other and designed in such a way as to obtain a miniaturized, economical, easy to assemble, precise and aligned module by construction.

In a second aspect thereof, the present invention relates to an optical code reader comprising an imager module made according to the first aspect of the invention.

The present invention in at least one of the above aspects can present at least one of the characteristics that follow.

In an embodiment, said single PCB constitutes a wall of said frame. In an embodiment, said single PCB constitutes the upper wall of the frame.

The single PCB is secured to the frame with mechanical coupling devices (for example, suitable plugs, bolts and the like).

In an embodiment, said drive shaft comprises a plurality of magnets (e.g., four magnets).

In an embodiment, said drive shaft comprises a tube (for example made of steel) housing the plurality of magnets In an embodiment, said position sensor device comprises at least two Hall sensors positioned on said PCB.

In an embodiment, the two Hall sensors are positioned on said PCB in close proximity to said drive shaft in order to detect the magnetic field generated by the plurality of magnets. In an embodiment, the two Hall sensors are positioned on said PCB such as to hold as compactly as possible the lens system motion actuator without saturating the two Hall sensors and limiting as much as possible the amplification of the output signals from these sensors.

In an embodiment, said PCB comprises a lower face facing towards said drive shaft and the two Hall sensors are positioned on said lower face of the PCB. In one embodiment, the distance between two Hall sensors (in particular the two centers of the two Hall sensors) is greater than said stroke. In an embodiment, the distance between the two Hall sensors (in particular between the two centers of the two Hall sensors) is such as to provide two output electric signals of position (in particular, a sinusoidal signal and a cosinusoidal signal) in quadrature. In one embodiment, the distance between the two Hall sensors (in particular between the two centers of the two Hall sensors) is equal to one-fourth of the pole pitch (the pole pitch corresponding to the sinusoidal signal and the cosinusoidal signal period).

In an embodiment, the magnets are elementary magnets with a reciprocal arrangement and configuration (in number, shape and size) such as to create a predefined pole pitch.

In an embodiment, said control device comprises a processing unit adapted to implement both movement functions to control the kinematics of the drive shaft and measuring functions to determine the position of the drive shaft based on detections made by the position sensor device. Said processing unit is preferably integrated into a single electronic processor.

In an embodiment, said PCB comprises an upper face and said processing unit is positioned on said upper face of the PCB.

In an embodiment, this processing unit comprises an analog to digital converter electrically connected to said position sensor device, adapted to convert the analog signals coming from the position sensor device to digital ones.

In an embodiment, such analog to digital converter is a 12-bit converter.

In an embodiment, said control device comprises an amplifier electrically interconnected between this analog to digital converter and said position sensor device In an embodiment, the processing unit comprises a measuring module (using an appropriate software) adapted to determine the position of the drive shaft based on detections made by the position sensor device and a feedback circuit configured to control the movement of the drive shaft based on the position (and movement speed) determined by the measuring module.

In an embodiment, said control device comprises a current sensor (for example, current-voltage converter) adapted to detect the linear electric motor current.

In an embodiment, the processing unit comprises a feedback circuit configured to perform a feedback control of the movement of the drive shaft based on the current detected by said current sensor. This allows for convenient control of the force used to move the drive shaft and the load connected to it.

In an embodiment, the electric motor is a three-phase electric motor comprising three electrical windings electrically connected to said control device.

In an embodiment, the electric motor is a three-phase brushless electric motor.

In an embodiment, the processing unit is adapted to generate, using said feedback circuit, a three-phase PWM electrical drive signal (namely, pulse width modulation) for the three electrical windings.

In an embodiment, the control device (especially the processing unit) has an electrical connection interface to an electronic board that is external to it.

In an embodiment, the control device (particularly the processing unit) is adapted to receive from said electronic board data indicative of the desired position for said drive shaft and to control the movement of the drive shaft based on that desired position.

In an embodiment, the control device (particularly the processing unit) is adapted to provide said electronic board with data indicative of the determined position of the drive shaft.

In an embodiment, said frame is made (in an embodiment completely) of self-lubricating materials (such as polyoxymethylene or POM) and defines a guide for the support and sliding of said shaft. This avoids the use of bushes, increasing the simplicity of construction and economy of the lens system movement actuator.

In an embodiment, the drive shaft is operatively connected to the lens system via a mechanical coupling (e.g. fork-shaped) adapted to transfer the linear motion of the drive shaft to the lens system.

BRIEF DESCRIPTION OF THE DRAWINGS

Further features and benefits of the device of the present invention will become more evident from the following detailed description of one embodiment thereof, by way of a purely illustrative and non-limiting example with reference to some of the attached drawings. In said drawings.

DETAILED DESCRIPTION OF THE DRAWINGS

Figure 1:
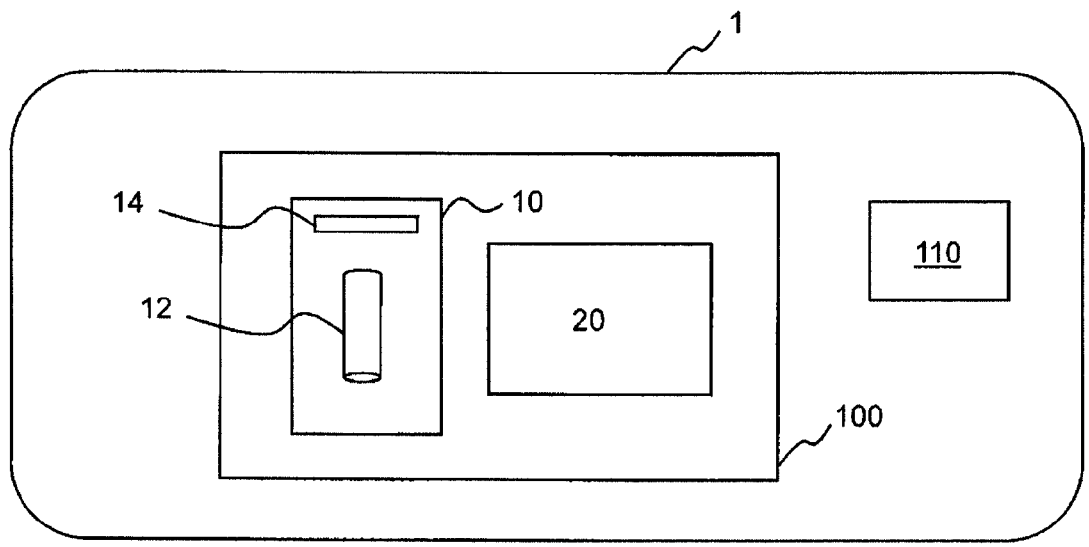
FIG. 1 schematically shows a bar code reader according to the invention.

FIG. 1 schematically shows a bar code reader 1. The optical code reader 1 can be portable, for example, handheld or "gun shaped", for use, for example, in a warehouse or refrigerator, where objects with optical codes can be on different shelves, at different distances from the reader 1. Optical code reader 1 can also be of the fixed-type for use, for example, in self-scanning kiosks or material recycling machines.

In general, it is useful in these applications to have a reader capable of focusing on optical codes within a predetermined range of distances. Especially in the case of portable readers it is important that the predetermined range of distances is sufficiently wide, for example from 15 cm to 15 m.

For example, the reader 1 is capable of reading optical codes having a resolution of 2 mils (0.050 mm) at a near distance of 15 cm and optical codes of 300 mils (7.62 mm) at a distance of 15 m.

The imager type reader 1 comprises an imager module 100 comprising a camera 10 and an actuator for moving the lens system 20.

The camera 10 is a color or black and white digital camera. The camera 10 can be linear (1D) or two-dimensional (2D) or a stereo camera (3D).

The camera 10 comprises a lens system 12 (comprising, for example, a lens barrel) and a CCD or CMOS sensor 14 for example.

As shown in FIGS. 2-10 and 12, the actuator for moving the lens system 20 comprises a three-phase brushless electric linear motor 30 and a PCB 40 (i.e., a printed circuit).

The linear electric motor 30 comprises a frame 31, a drive shaft 32 and a three-phase electrical coil 33, comprising three electrical windings U, V, W.

Figure 7:
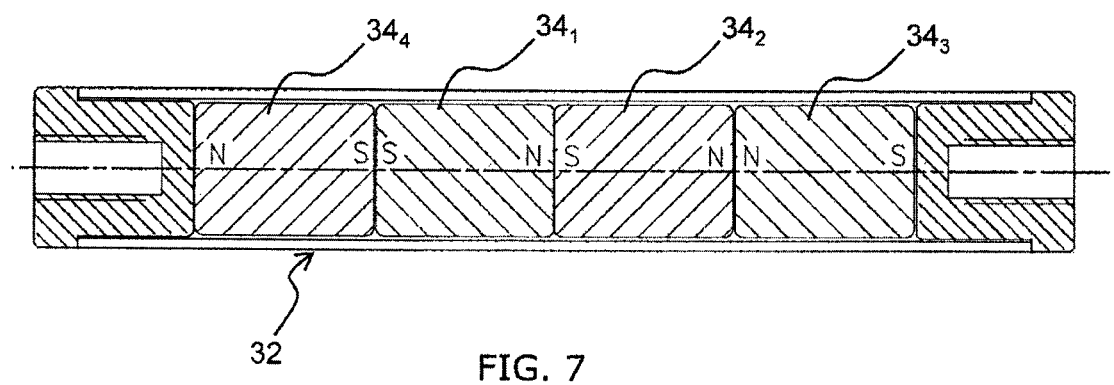
FIG. 7 shows an axial section of an embodiment of a drive shaft which can be used in the actuator of FIG. 4.

FIG. 7 shows the details of a drive shaft 32 section, comprising a tube (in an embodiment made of steel) housing four magnets 34, positioned along the axis of the drive shaft 32. For example, the magnets 34 are made of neodymium. The polarity of the magnets 34 is shown in FIG. 7 where it is seen that the two internal magnets $34_1$ and $34_2$ have inner ends with opposite polarities between them and outer ends with polarity equal to the inner end of the two external contiguous magnets $34_3$ e $34_4$. The four magnets 34 are equally sized (length and diameter).

The frame 31 comprises a seat 36, to house the electrical coil 33 and two through-holes 35, forming a passage with no contact where the drive shaft 32 slides. The frame 31 also comprises an outer structure 50 adapted to laterally surround the frame 31. The external structure 50 has two through-holes 51 for the drive shaft 32 and is open above and below. The external structure 50 is mechanically coupled to the frame 31 by means of coupling pins 52 adapted to engage in specific seats 53 of the frame 31. The pins 52 have a centering and locking function for the element 50 while the holes 51 create a calibrated pressure on the shaft thus generating a preload that is useful in holding the shaft in place while at rest without consuming power for this function.

As can be seen from FIGS. 2-5, once assembled, the drive shaft 32 passes through the holes 35, the hole 37 defined by the electrical coil 33 and the holes 51 of the structure 50 and is axially sliding within a predefined stroke length, for example of 3 mm.

The frame 31 is may be entirely made of self-lubricating material (such as polyoxymethylene or POM) thus enabling frictionless sliding of the drive shaft 32 within the holes 35, with no need of bushings. This advantageously allows for the implementation of the frame 31 as a single piece (of self-lubricating material).

The PCB 40 defines a wall, the upper wall in the example, of the frame 31. The PCB 40 is fixed to the frame 31 by means of appropriate mechanical coupling means 41, such as riveted plugs or bolts or miniature screws.

The PCB 40 comprises a flexible connector 44.

Figure 2:
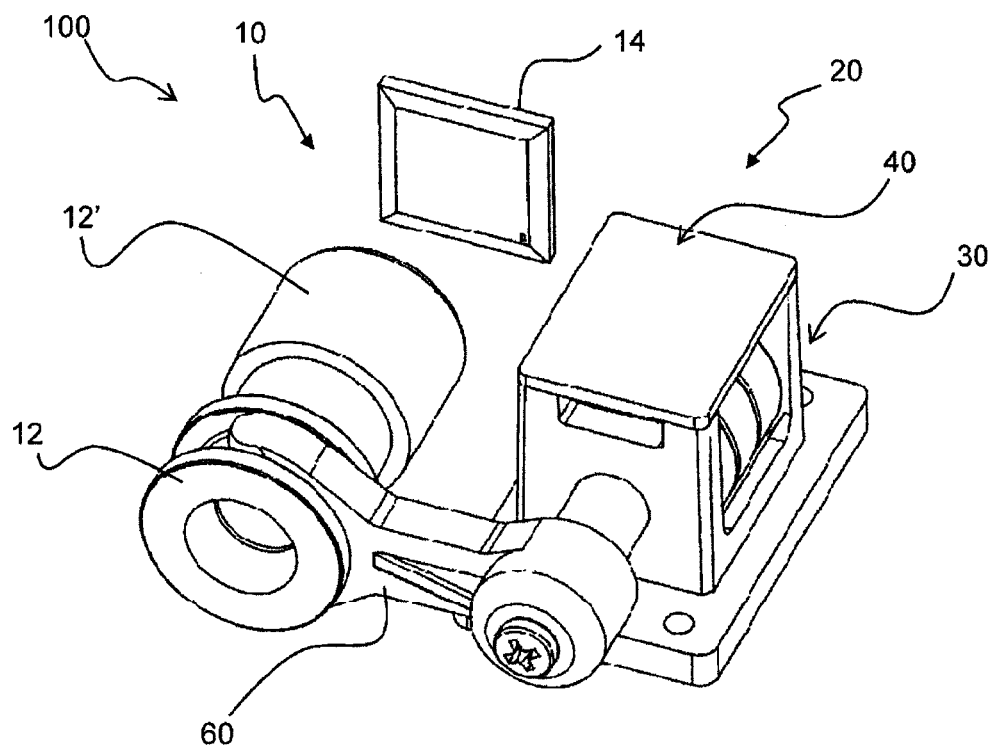
FIG. 2 shows in perspective an imager module of the reader of FIG. 1.
Figure 3A:
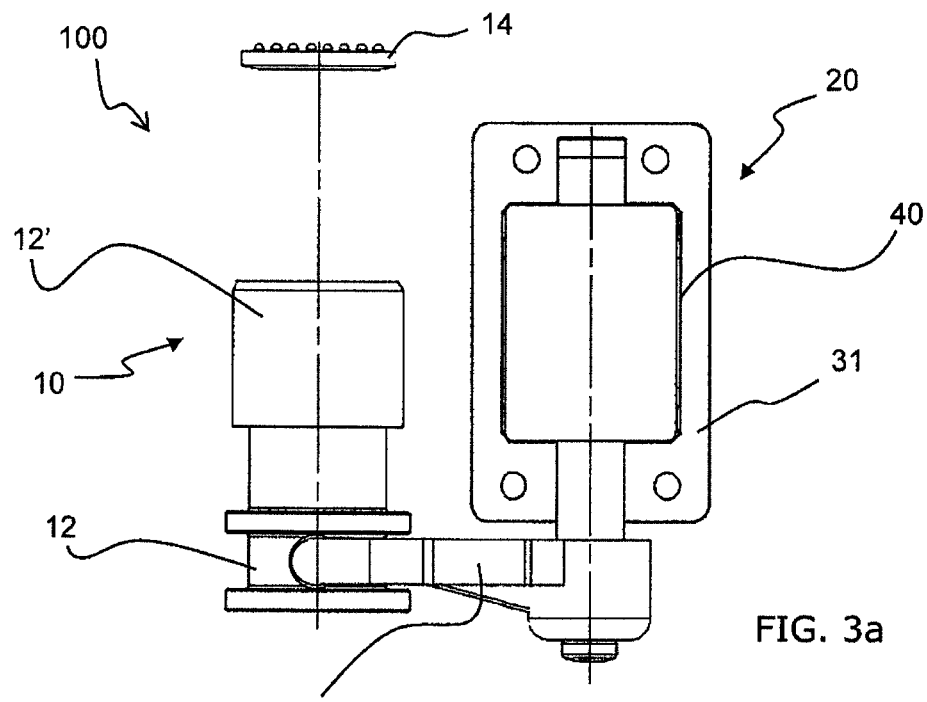
FIGS. 3a and 3b show the imager module of FIG. 2 in two different operating positions (two different focus positions)
Figure 3B:
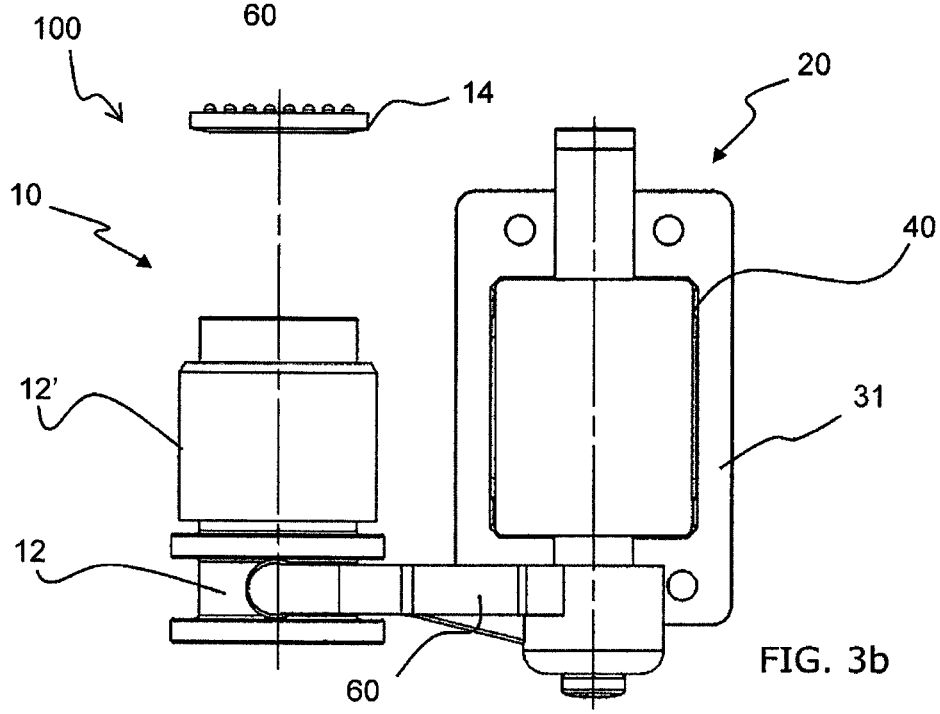

As shown in FIGS. 2 and 3, the actuator for handling the lens system 20 is mechanically coupled to the lens system 12 so as to transfer the axial movement of the drive shaft 32 to the lens system 12. In the example of FIGS. 2 and 3, the actuator for handling the lens system 20 is mechanically coupled to the lens system 12 by means of a fork mechanism 60. As shown in FIGS. 3a and 3b, the drive shaft 32 is adapted to axially move within the above predefined stroke length and accordingly move the lens system 12 (that slides within a bushing 12') according to a linear movement parallel to the axis of the shaft 32, moving closer or away from the sensor 14. FIGS. 3a and 3b show the lens system 12 in two operationally opposite positions (which correspond to two different focusing positions), at both ends of that predefined stroke length.

Figure 8:
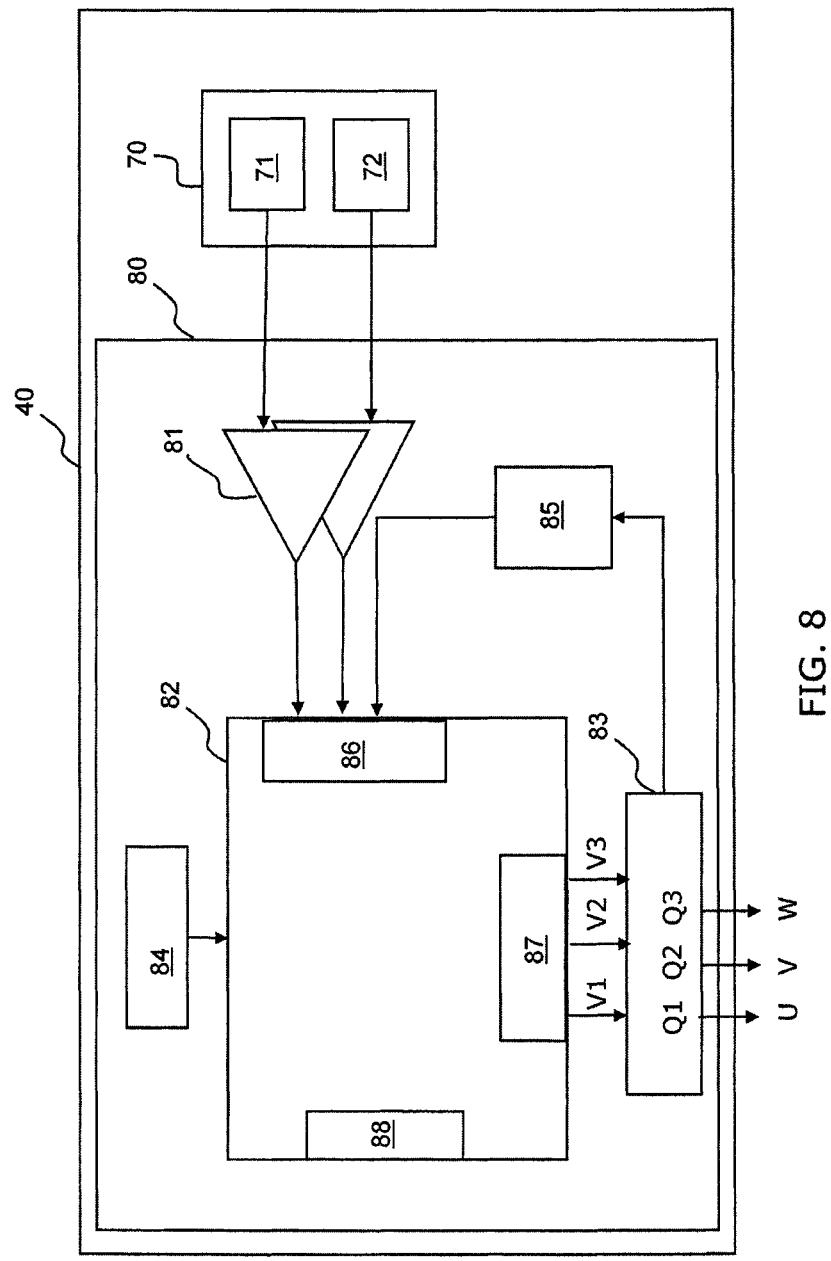
FIG. 8 shows an embodiment of a PCB block diagram which can be used in the actuator of FIG. 4.

As schematically shown in the block diagram of FIG. 8, the PCB 40 comprises a position sensor device 70 adapted to detect the drive shaft 32 position and a control device 80 adapted to control the movement of the drive shaft 32. In particular, as described in more detail below, the control device 80 is adapted to determine the drive shaft 32 position, based on detections made by the position sensor device 70, and to perform a feedback control of the movement of the drive shaft 32, based on the determined position of the drive shaft.

The position sensor device 70 comprises two Hall sensors 71, 72.

Figure 6:
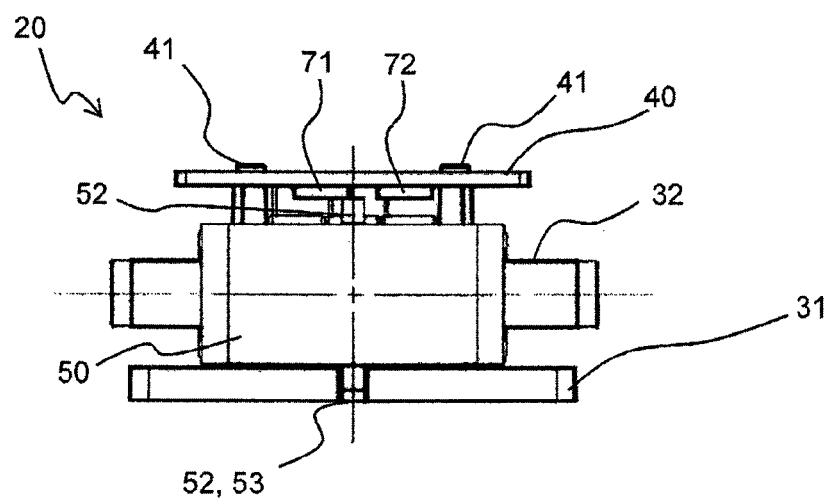
FIG. 6 shows a side view of the actuator of FIG. 4.
Figure 9:
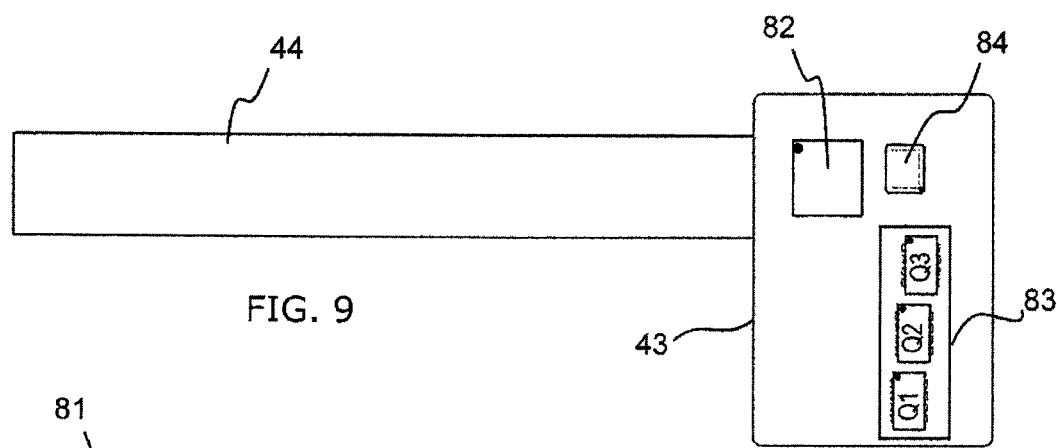
FIG. 9 shows a diagram of the PCB upper face of FIG. 8.
Figure 10:
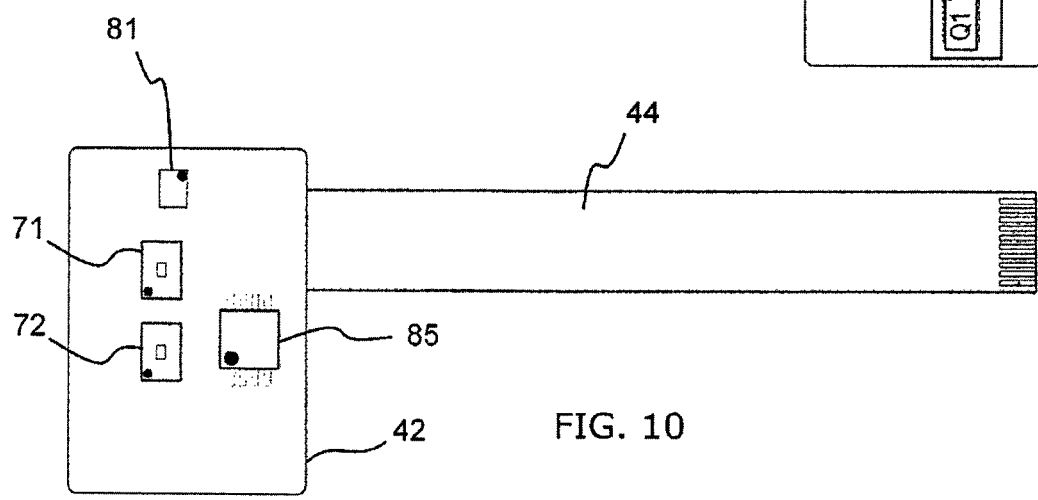
FIG. 10 shows a diagram of the PCB upper face of FIG. 8.

As schematically shown in FIGS. 9 and 10, the PCB 40 comprises two layers or faces, particularly a lower face 42 and an upper face 43. The two Hall sensors 72, 71 are placed on the lower face 42, such that once the PCB 40 is mounted on the frame 31 through the mechanical coupling means 41, they are located near the drive shaft 32 (as shown in FIG. 6) such as to detect the magnetic field generated by magnets 34.

As described more in detail below, the distance between two Hall sensors 71, 72 (in particular the two centers of the two Hall sensors) is greater than the predefined stroke. In an embodiment, the distance between the two Hall sensors 71, 72 (in particular between the two centers of the two Hall sensors) is such as to provide two output electrical analogue signals in quadrature (in particular, a sinusoidal signal (sin) and a cosinusoidal signal (cos) in quadrature). The distance between the two Hall sensors 71, 72 (in particular between the two centers of the two Hall sensors) is equal to one-fourth of the pole pitch, i.e. to a quarter of the period of the sin/cos signals.

The control device 80 comprises an amplifier 81, a processing unit 82, an H bridge 83, a quartz oscillator 84 and a current detector 85. As schematically shown in FIGS. 9 and 10, the amplifier 81 and the current detector 85 are located on the lower face 42 of the PCB along with two Hall sensors 71, 72 while the processing unit 82, the H-bridge 83 (represented by three transistors Q1, Q2, Q3) and the quartz oscillator 84 are located on the upper face 43 of the PCB 40.

The processing unit 82 may be integrated into a single electronic processor such as, for example, a single microprocessor or microcontroller.

The quartz oscillator 84 is adapted to provide a clock signal to the processing unit 82.

With reference to the FIG. 8, the processing unit 82 is connected to the position sensor device 70 by means of the amplifier 81. The processing unit 82 comprises an analog to digital converter 86 and a three-phase PWM signal generator 87.

The amplifier 81 comprises two stages of amplification in parallel, adapted to amplify in parallel the two analog electrical signals from both Hall sensors 71, 72.

The analog to digital converter 86 is connected to the amplifier 81 in order to receive two analog amplified electrical signals and to convert them to digital signals.

As can be seen from FIG. 6, once the PCB 40 is fixed to the frame 31, this PCB is located at a certain distance from the outer frame 50. The distance is defined such as to have a very compact system (minimum distance) that is compatible with two electrical features: (a) non-saturation of the output electric signals from both Hall sensors 71, 72, and (b) limitation of the amplification level of these electrical signals in order to ensure the correct dynamics for the analog to digital conversion of the analog to digital converter 86.

The processing unit 82 also has an interface 88 (such as I2C, SPI or RS232) in order to communicate with an outer electrical board 110 (shown schematically in FIG. 1), such as an electrical motherboard of the barcode reader 1. This electrical board 110 is adapted such as to determine, according to well-known algorithms and therefore not described below, the desired position for the drive shaft 32 which makes it possible to periodically focus on the optical code to be read, depending on the distance of the code from the camera 10 lens system 12. According to well-known techniques in this field, this distance can be automatically detected by the reader 1 or by an associated distance meter (not shown).

The interface 88 is electrically connected to the flexible connector 44 of the PCB 40.

The processing unit 82 is therefore adapted to receive from the electrical board 110, by means of the interface 88, the desired location for the drive shaft 32. Furthermore, the processing unit 82 is adapted—if required by the above electrical board 110—to provide the latter, by means of the interface 88, the current position of the drive shaft 32, determined thereby.

The processing unit 82 is adapted to implement both measurement algorithms adapted to determine the location of the drive shaft 32, based on detections made by both Hall sensors 71, 72, and movement algorithms, adapted to control the movement of the drive shaft 32, based on the current position of the drive shaft 32 and the desired position.

The measurement algorithms are adapted to determine the position of the drive shaft 32 based on appropriate processing and trigonometric operations carried out on both quadrature signals from both Hall sensors 71, 72.

The movement algorithms are adapted to generate the appropriate electrical signals, adapted to drive the three windings U, V, W of the electrical coil 33 such that they create an electromagnetic field adapted to act on magnets 34 in order to move the drive shaft 32 into the desired position.

During use of the reader 1, the processing unit 82 is adapted to receive, by means of the interface 88, the desired location for the drive shaft 32 and to determine the current location of the drive shaft using these algorithms. Based on the current position and the desired position of the drive shaft 32, the processing unit 82 is adapted to generate, by means of appropriate algorithms implemented by the three-phase PWM signal generator 87, three electrical voltages, V1, V2, V3, to be applied to the three windings U, V, W of the electrical coil 33, by means of the H bridge 83. Such voltages V1, V2, V3 are applied to the three windings U, V, W, following a time sequence such as to produce for the three windings U, V, W an electromagnetic field capable of acting on magnets 34 such as to move the drive shaft 32 into the desired position.

In an embodiment, once the drive shaft 32 is in the desired position by means of the interface 88, the processing unit 82 is adapted to generate a desired movement profile that allows the drive shaft 32 to be moved from the current position thereof to the desired position gradually and gently (not in steps). This advantageously allows the dynamic characteristics of the system to be respected and to optimize power consumption and focusing time by avoiding the imposition of physically unobtainable movement profiles due to applicable inertia.

Figure 11:
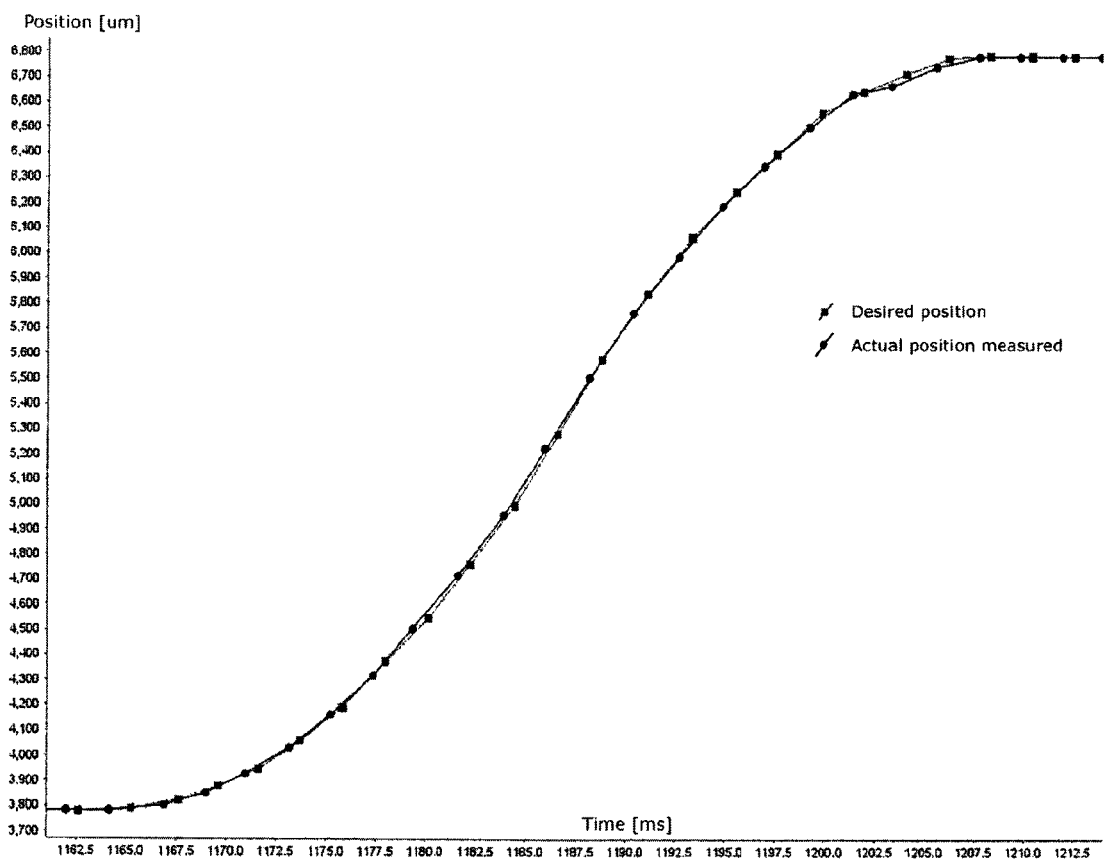
FIG. 11 shows an example of an actual drive shaft movement profile, obtained experimentally with the actuator of FIG. 4, as compared to a desired movement profile.

FIG. 11 shows an example of the desired profile (curve with diamonds) generated by the processing unit 82 in order to move the drive shaft 32 from one end to the other of the predefined stroke of 3 mm and an example of real profile (curve with rods), obtained experimentally (using the example of the imager module 100 described later). As can be seen, the movement actuator 20 is adapted to move the drive shaft 32 with a real movement profile that mimics the desired movement profile, within certain response times (focus time). In the example in FIG. 11, the movement of 3 mm is performed in about 40 ms with very low trajectory lag errors.

In an embodiment, the processing unit 82 is adapted to control the feedback operation of the three windings U, V, W of the electrical coil 33. The feedback control is carried out by comparing instant by instant the current value x of the drive shaft position with the desired position value x* and adjusting instant by instant the three electrical voltages V1, V2, V3 to be applied to the three windings U, V, W of the electrical coil 33 depending on the result that emerged from said comparison.

Figure 12:
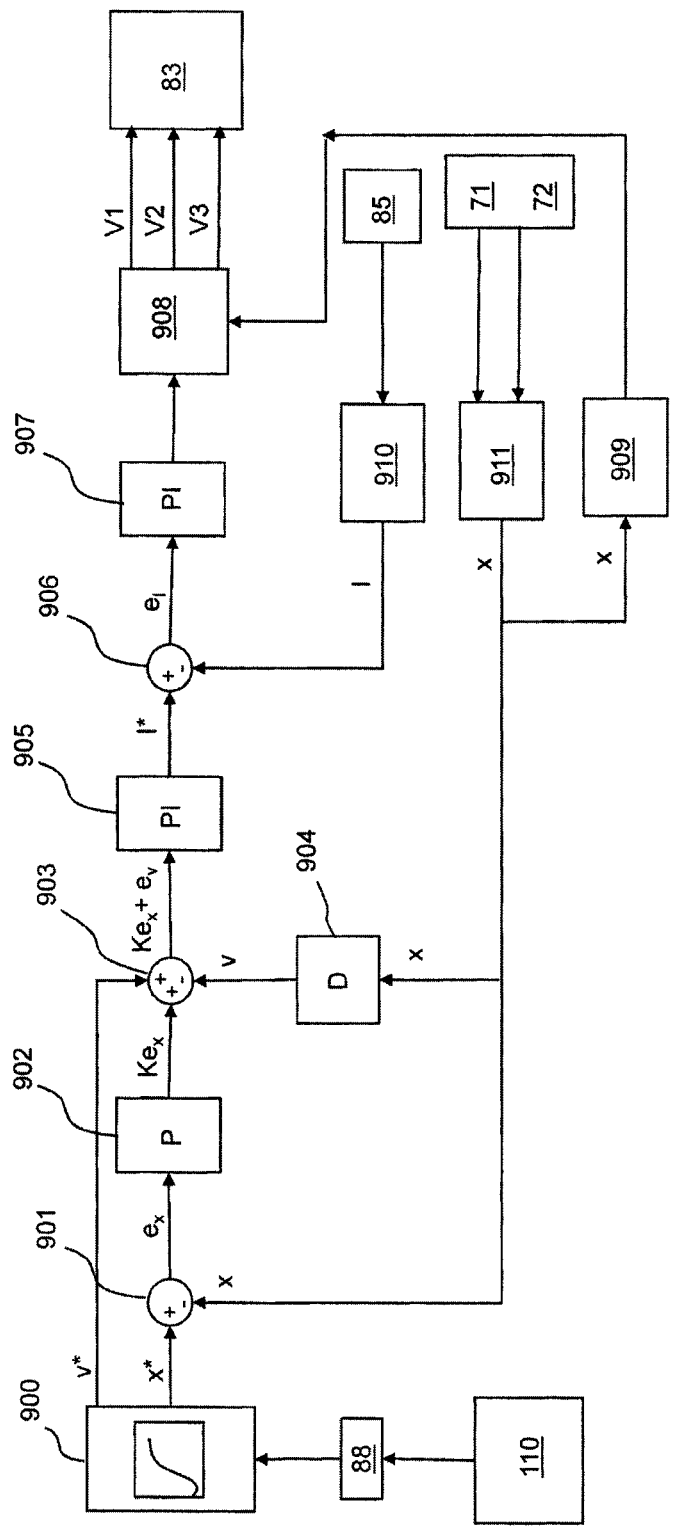
FIG. 12 shows a block diagram of an embodiment of a feedback circuit which can be implemented by the actuator of FIG. 4.

FIG. 12 shows schematically a feedback control made from the processing unit 82 according to an embodiment of the invention. In this embodiment, the control is performed with three feedback loops: one based on the x position of the drive shaft 32, one on the displacement speed v of the drive shaft 32 and one on the current of the three windings U, V, W of the electrical coil 33.

As shown in FIG. 12, the feedback control is implemented by means of a Proportional-Integral-Derivative (PID) controller. In the circuit of FIG. 12, at the block 900, the processing unit 82 receives, by means of the interface 88, the desired position from the electrical board 110 and generates the desired gradual movement profile (desired x* position and v* speed with respect to time as shown in FIG. 11). At each moment, the block 901, receives from the block 900 the desired position value x* at that instant and the x position provided by the block 911, which is a measurement module (software) adapted to determine the x position at that instant, based on detections made by both Hall sensors 71, 72. The block 901 compares (by subtraction) the two values of position x* and x, creating a position error $e_x$ (x*−x) that is sent to the proportional block (P) 902.

The block 902 generates a signal $K^*e_x$ proportional to the position error $e_x$. The block 903 receives the signal $K^*e_x$ from the block 902, the desired speed v* from the block 900 and the current speed v from the derivative block (D) 904, which in turn receives as an input the x position from the block 911 and provides as an output the speed v. The block 903 compares (by subtraction) the two values of speed v* and v, with a speed error of $e_v$(v*−v) which is sent along with the position error $K^*e_x$, to the integrative block (PI) 905. The block 905 generates a desired current signal I*. The block 906 receives the signal I* from the block 905 and the current I from the block 910, which is adapted to determine the current flowing in the three windings U, V, W of the electrical coil 33 based on the detections made by the current sensor 85.

The block 906 compares (by subtraction) the two values of current I* and I, creating a current error $e_I$ (I*−I) that is sent to the integrative block (PI) 907. The block 907 generates a signal that chokes a power switch which allows the flow of electrical current to the electrical coil 33 thus controlling the average current within the electrical coil 33 associated with the mechanical force applied to the drive shaft 32 of the coil 33. The block 908 implements the three-phase PWM signal generator 87 and is adapted to receive the output signal from the block 907 in order to generate three voltages V1, V2, V3 adapted to drive three transistors Q1, Q2, Q3 present within the H-bridge 83. Finally, the 909 block implements a phase selector. This selector, receiving the x position from the block 911, can determine which of the three windings U, V, W of the electrical coil 33 is activated in order to move the drive shaft 32 to the desired position and thus control the three-phase PWM signal generator 87 of the block 908. Due to the three feedback loops, the drive control of the three windings U, V, W of the electrical coil 33 is performed in such a way as to exactly reproduce the movement profile desired over time, as shown by the curves of FIG. 11.

An imager module 100 may be adapted to operate within that predetermined range of distances ("working range"), ranging from 15 cm for optical codes having a resolution of 2 mils to 15 m for optical codes with resolution of 300 mils. Starting from the said working range, a 14-degree field of view may be established on a sensor 14 with a resolution of 1.2 Megapixels and a diagonal size of the sensor 14 equal to ⅓ of an inch. A focal length of 18.8 mm may be defined, which is the distance used between the lens system 12 and the sensor 14 to focus on an image at a distance of 15 cm. As a result, to focus on an image at a distance of 15 m, the lens system 12 may be moved over a distance of 3 mm. This has then defined the stroke of the drive shaft 32. Given the constraints linked to operative ambient light and sensor 14 capacity in exposure adjustment, a fixed opening of the sensor 14 equal to f/5 may be chosen. Based on this opening, a positioning accuracy of ±5 μm may therefore be defined for the focusing.

Based on the opening F/5 and focal distance of 18.8 mm, the diameter of the lens system 12 barrel (diameter of the lenses) from which the weight to be moved was derived may be chosen. The necessary thrust in Newtons was calculated from the weight.

Commercially available steel tubes with a diameter of 4 mm, which set the diameter of 4 mm for magnets 34, may be utilized.

In order to ensure that the sin/cos signals from the Hall sensors 71, 72, are offset by 90 degrees, the distance between these sensors (especially their centers) is to be ¼ of the pole pitch (where the pitch indicates the period of sin/cos signals). Furthermore, to ensure an absolute measurement of the position from the sin/cos signals, the ¼ of the pole pitch is to be larger than the 3-mm stroke. Based on such considerations, the ¼ of the pole pitch may be set to 4.5 mm (to have margin and avoid edge effects) and, therefore, the pitch of 18 mm, the number of magnets 34 equal to 4 and the length of magnets 34 equal to 4.5 mm.

Once the magnets 34 are sized, based on the required force, with the constraint of an operating current of 250 mA, and maximum of 500 mA, the windings U, V, W of the electrical coil 33 may be utilized, thereby choosing the wire diameter to be wrapped and the number of turns per winding.

The actuator 20, thus designed, has a small footprint of 24 mm×14 mm×14.1 mm, corresponding to a volume of about 4.74 cm$^3$. In turn, the imager module 100 has a size of 38 mm×35 mm×20 mm, corresponding to a volume of about 26.6 cm$^3$. The bulk of the actuator 20 is therefore limited to about 18% of the overall dimensions of the imager module 100.

It may be observed that, given the pole pitch of 18 mm, the maximal position detection accuracy obtainable depends on the noise and number of bits used for the analog to digital conversion. Given the above positioning accuracy (set at ±5 μm), a 12-bit converter which, supplying 4096 levels for a pole pitch of 18 mm, manages to guarantee a theoretical positioning detection accuracy of 4.39 μm (obtained from 18 mm/4096) may be used. It has been observed experimentally that the imager module 100 thus designed can contain the noise to within a level that would ensure (based on the above theoretical accuracy of 4.39 μm) the required actual accuracy of ±5 μm, performing a proper calibration procedure.

In addition, as evident from FIG. 11 experimental results obtained with the imager module 100 designed as in the example above, the movement 20 actuator is able to move the drive shaft 32 for a 3 mm stroke in about 40 ms with a power of 250 mW.

By the present description it is clear that the actuator for lens system 20 movement in the imager module 100 may be miniaturized due to the fact that the control device 80 and the position sensor device 70 are integrated into a single PCB 40, which is part of the frame 31 of the linear electric motor 30. Miniaturization means an actuator 20 volume less than 5 cm$^3$ and/or an actuator 20 volume less than 20% of the volume of the imager module 100.

The integration of the control device 80 and position sensor device 70 in a single PCB 40 further allows to achieve high accuracy both for the detection of the drive shaft position (ensuring, for example, a precision of ±5 μm in the two feed directions of the shaft, with virtually zero hysteresis) and for giving a movement command to the drive shaft (ensuring, for example, that a movement command of 5 μm is given to the drive shaft with a negligible error with respect to the precision set). As shown in FIGS. 9 and 10, this integration allows the distance to be shortened of the electrical connection paths between the two Hall sensors 71, 72, the amplifier 81 and the analog-to-digital converter 86 contained in the processing unit 82, thus reducing the electrical noise of the position sensor device 70.

Figure 4:
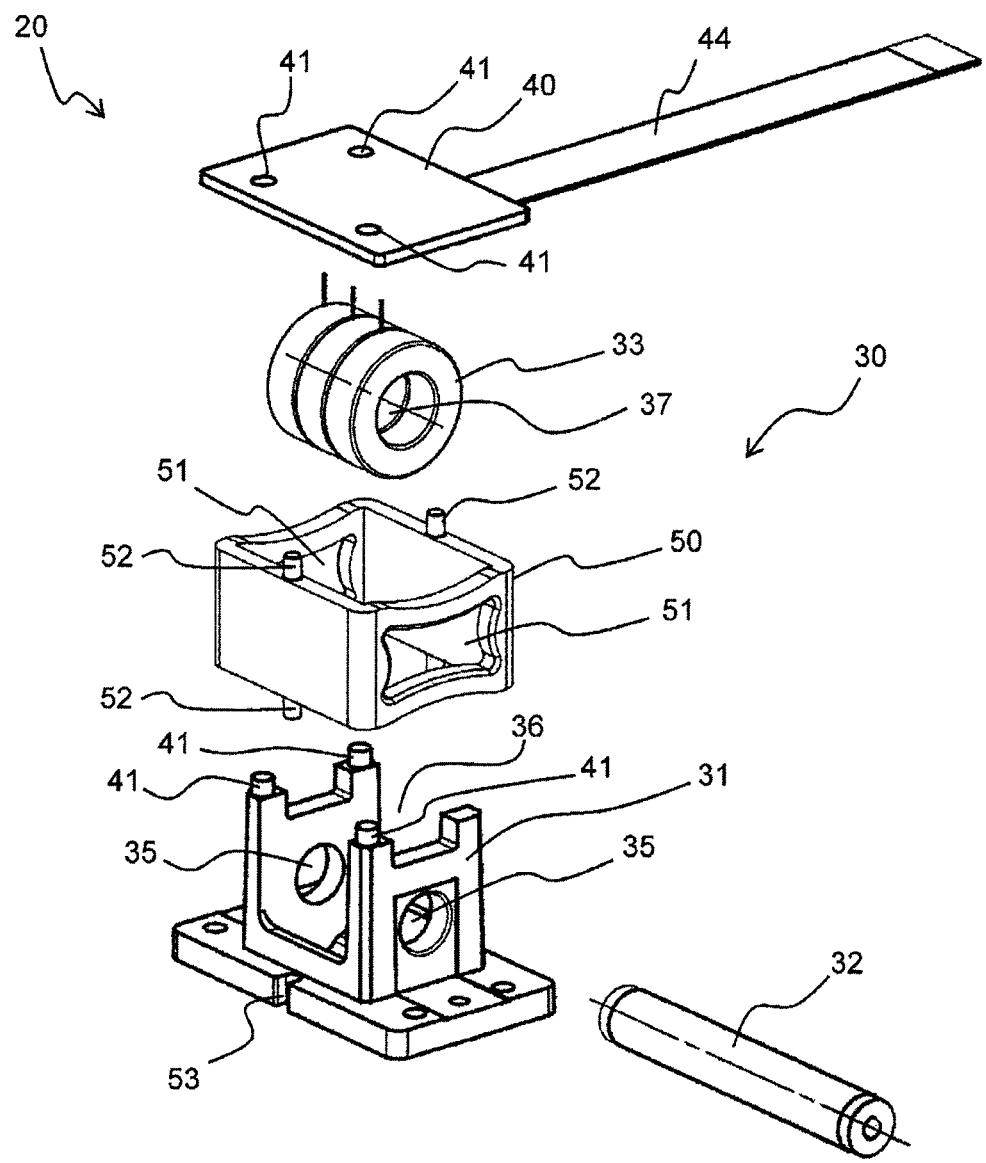
FIG. 4 shows an exploded view of an actuator for the imager module lens system movement of FIG. 2.
Figure 5:
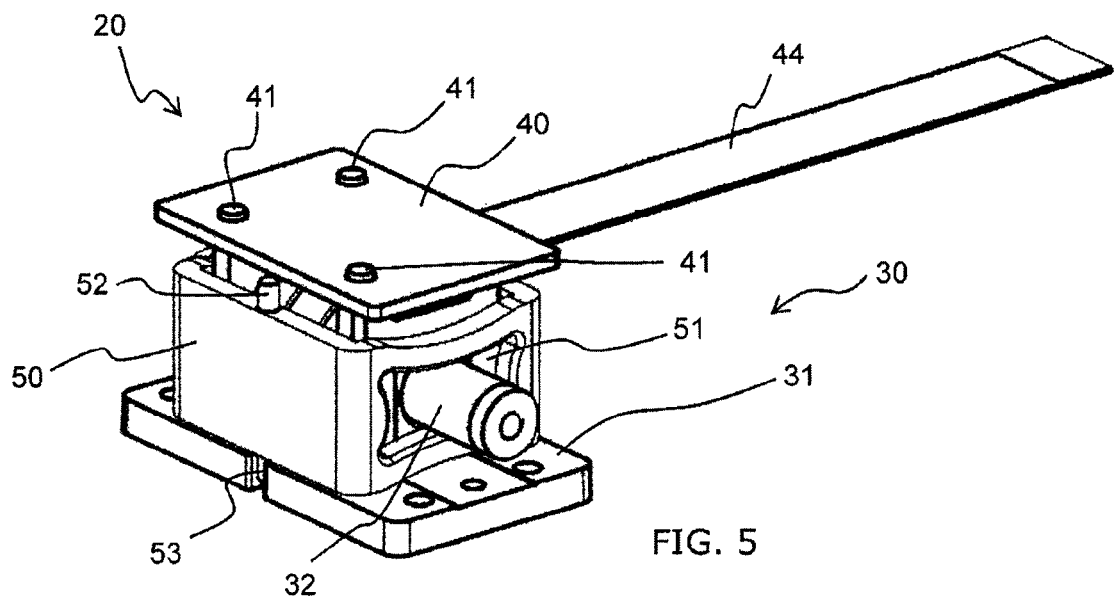
FIG. 5 shows in perspective the assembled actuator of FIG. 4.

Furthermore, it is observed that each positioning error in the distance between the two Hall sensors 71, 72 can generate distortion within the measurement insofar as the signals obtained are not perfectly in quadrature. However, as shown in FIGS. 4-6, the integration of the position sensor device 70 into the PCB 40, which is part of the electric motor 30 frame 31, allows to provide, by construction, the ideal mechanical coupling between such position sensor device 70 and the drive shaft 32, thus increasing the mechanical coupling precision. In fact, for the installation of the position sensor device 70, it is sufficient that both Hall sensors 71, 72 are soldered on the PCB 40 at predetermined positions. After soldering, the optimal positioning of the two Hall sensors 71, 72 with respect to the drive shaft 32 is established by the construction of the mechanical coupling (by means of the coupling means 41) between the PCB 40 and the frame 31 of the electric motor 30. Therefore, the only error possibility in the positioning of Hall sensors 71, 72 (which is minimal) is confined to the soldering process of the two Hall sensors 71, 72, while any errors can be compensated with a suitable calibration procedure during the test phase of the actuator 20. For the rest, proper positioning is guaranteed by construction.

In addition, as described above, the integration of the control device 80 and position sensor device 70 in the PCB 40 implements the measurement algorithms for determining the position of the drive shaft 32 and the movement algorithms for controlling the movement of the drive shaft 32 within the same processing unit that integrates into a single electronic processor (for example, a microprocessor or micro-controller) both analog-to-digital conversion functions and functions for the generation of a three-phase PWM electrical drive signal of the three windings U, V, W of the electric motor 30.

In the imager module 100 according to the invention, the various components are thus positioned close to each other and designed in such a way as to obtain a miniaturized, economical, easy to assemble, fast, with low power consumption, precise and aligned module by construction.

The previous description is of a preferred embodiment for implementing the invention, and the scope of the invention should not necessarily be limited by this description. The scope of the present invention is instead defined by the following claims.

We claim:

1. An imager module for an optical code reader, comprising:
   a camera comprising a lens system;
   an actuator for moving the lens system, operatively connected to the lens system for autofocus adjustment, the actuator comprising a linear electric motor with a drive shaft, a position sensor device adapted to detect the position of the drive shaft within a predetermined stroke length and a control device adapted to control the movement of the drive shaft, and wherein:
   the control device and the position sensor device are integrated in a single printed circuit board (PCB);
   the linear electric motor comprises a frame that supports the drive shaft; and
   said single PCB constitutes part of said frame.

2. The imager module according to claim 1, wherein said single PCB constitutes a wall of said frame.

3. The imager module according to claim 1, wherein said drive shaft comprises a plurality of magnets.

4. The imager module according to claim 1, wherein said position sensor device comprises at least two Hall sensors positioned on said PCB.

5. The imager module according to claim 4, wherein said PCB comprises a lower face facing towards said drive shaft and the two Hall sensors are positioned on said lower face of the PCB.

6. The imager module according to claim 1, wherein said control device comprises a processing unit adapted to implement both movement functions to control the kinematics of the drive shaft and measuring functions to determine the position of the drive shaft based on detections made by the position sensor device.

7. The imager module according to claim 6, wherein said processing unit is integrated in a single electronic processor.

8. The imager module according to claim 6, wherein said processing unit comprises an analog-to-digital converter electrically connected to said position sensor device, adapted to convert analogue signals coming from the position sensor device into digital form.

9. The imager module according to claim 6, wherein the processing unit comprises a measuring module adapted to determine the position of the drive shaft based on detections made by the position sensor device and a feedback circuit configured to control the movement of the drive shaft based on the position determined by the measuring module.

10. The imager module according to claim 6, wherein said control device comprises a current sensor adapted to detect the current of the linear electric motor.

11. The imager module according to claim 10, wherein the processing unit comprises a feedback circuit configured to perform a feedback control of the movement of the drive shaft based on the current detected by said current sensor.

12. The imager module according to claim 1, wherein said frame is made of self-lubricating material and defines a guide for supporting and sliding said drive shaft.

13. An optical code reader comprising:
   a camera comprising a lens system;
   an actuator for moving the lens system, operatively connected to the lens system for autofocus adjustment, the actuator comprising a linear electric motor with a drive shaft, a position sensor device adapted to detect the position of the drive shaft within a predetermined stroke length and a control device adapted to control the movement of the drive shaft, and wherein:
   the control device and the position sensor device are integrated in a single printed circuit board (PCB);
   the linear electric motor comprises a frame that supports the drive shaft; and
   said single PCB constitutes part of said frame.

* * * * *